Aug. 5, 1969    R. W. KIBLER    3,459,251
RUBBER TIRES WITH NYLON REINFORCEMENT CORD CONTAINING
DISPERSED THEREIN THE REACTION PRODUCT OF BORIC
ACID AND AN ALIPHATIC ALCOHOL
Filed March 31, 1965
FIG. 1
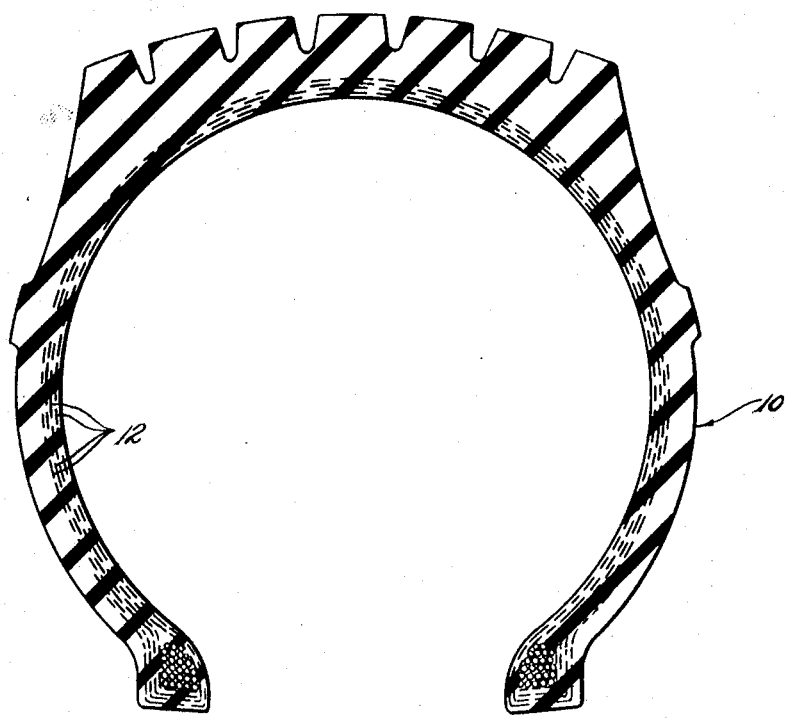
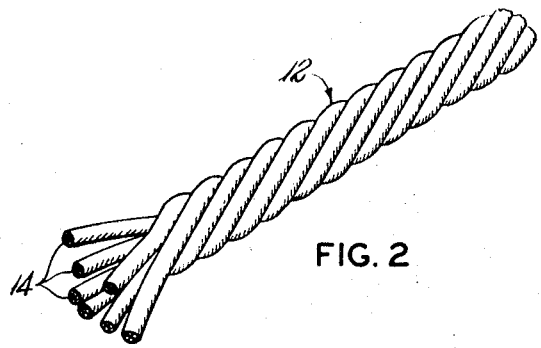
FIG. 2

United States Patent Office 3,459,251
Patented Aug. 5, 1969

3,459,251
RUBBER TIRES WITH NYLON REINFORCEMENT CORD CONTAINING DISPERSED THEREIN THE REACTION PRODUCT OF BORIC ACID AND AN ALIPHATIC ALCOHOL
Richard W. Kibler, Cuyahoga Falls, Ohio, assignor to The Firestone Tire & Rubber Company, Akron, Ohio, a corporation of Ohio
Filed Mar. 31, 1965, Ser. No. 444,464
Int. Cl. B60c 19/00
U.S. Cl. 152—330                         1 Claim

ABSTRACT OF THE DISCLOSURE

The flat-spotting characteristics of nylon tire cord reinforced tires can be substantially minimized by including in the nylon tire cord the reaction product of boric acid and an aliphatic alcohol.

---

This invention relates to nylon tire cord, yarns and filaments for use in nylon tire cord, nylon cord tires, and to an improvement in the process for producing nylon tire cord.

A number of different nylon compositions have been used in the production of tire cord. The use of nylon tire cord has, however, been limited as a result of a phenomenon commonly referred to as "flat-spotting" for rubber tires. When a vehicle stands for an extended period of time, those portions of the tires which are in contact with the ground flatten. The flattened portion tends to be retained for a substantial period of time after the vehicle is placed in operation. As the tire rotates, there is a decided thumping or slapping sound resulting from the flat spot on the tire. With many tire cords, what little flat spot is formed runs out quickly. However, the properties of nylon tire cord are such that the flat-spotting is retained substantially longer than with tires utilizing other tire cord materials.

In general, the tendency of an ordinary tire cord to flat-spotting, as reflected in its "response lag" measurement described hereinbelow, is of the order of 200 to 250 mils. The usual approach to prevent flat-spotting has been to increase the initial modulus (determined as described hereinbelow) of the tire cord by altering the polyamide in the tire cord, e.g., by mixing with high-melting polyamides, cross-linking, grafting and/or block polymerization. In general, the modulus is increased until the response lag is reduced to 160 mils or less.

This method has been reasonably successful in minimizing flat-spotting, but has not eliminated it. In fact, to the extent that any flat-spotting tendency remains after this treatment, the flat spot lasts for a much longer period of time before "running out," i.e., the vehicle must be operated for a considerably longer period time at any given speed to cause the disappearance of the flat spot.

It has now been found that the reaction product of boric acid and an aliphatic alcohol can be added to nylon filament, yarn, or tire cord, referred to hereinafter as nylon structures, to provide a product having improved properties which tend to minimize the problems associated with flat-spotting. The reaction product may be added directly to the formed structure or may be introduced into a nylon melt prior to the spinning or otherwise forming of the nylon structure.

It has also been found that while the introduction of the boric acid-alcohol reaction product into the nylon reduces the initial modulus of the nylon structure, the modulus at higher stresses is substantially unaffected. For example, at stress values of 6 to 8 pounds, the stress-strain curve for the treated material again becomes substantially the same as that for the untreated materials. The tensile properties of the treated material are not seriously reduced by the treatment. All stress values given herein are for a cord of 2 x 840 denier yarn unless otherwise indicated. Equivalent value for material of different denier can, of course, be determined in the usual manner.

Tire cord produced according to the present invention provides the advantage that any flat-spotting will tend to run out in a very short period after operation of a vehicle utilizing tires containing such tire cord. Further, because of the lower initial modulus and response lag, the flat spot is more yielding on the road, thus removing the amount of objectionable interaction between the wheel and the road. Thus, the undesirable thumping or slapping will be, at most, of very short duration and of less objectionable character. Carried to the ultimate in this direction, the flat spot will disappear during the first revolution of the tire and no flat-spotting will be detected.

In accordance with the present invention, the boric acid-aliphatic alcohol reaction products, which are useful, comprise those in which the boric acid has been reacted with an aliphatic alcohol having a boiling point substantially above 100° C. and wherein the reaction product is in liquid form under the conditions of use. As used herein, the reaction product is in liquid form under the conditions of use if it can be dissolved in non-interfering solvent, e.g., an excess of the alcohol, or if it can be melted and/or heated to provide the desired fluidity for addition to the nylon structure, either in filament form or as a melt, at a temperature which is non-injurious to either the reaction product or the nylon structure.

It is not essential that the reaction between boric acid and the alcohol proceed to esterification. Thus, the reaction products useful in the present invention include complex compounds formed by mixing boric acid with alcohol without the evolution of water. The resulting solution of complex compound is useful without further treatment. It has been found, however, that a superior additive is obtained if at least part of the water of reaction is removed to provide a product that is at least partially esterified. Thus, the present invention contemplates the use of the simple esters of boric acid including the mono-, di-, and triesters of boric acid. In its most preferred form, however, the invention contemplates the use of polyesters of boric acid, e.g., the polymeric reaction product of boric acid and a polyhydric alcohol.

In the preferred form of the invention, the reaction product is a non-volatile ester of boric acid and a polyhydric alcohol. By "non-volatile" is means that the ester will char before distilling even when under reduced pressure. These products are formed generally by removing the water of reaction from the reaction mixture.

Among the monohydric alcohols which are useful herein are the higher boiling alcohols, e.g., n-butyl alcohol and isobutyl alcohol, the amyl alcohols, hexyl alcohols, hepty alcohols, octyl alcohols, etc. The higher molecular weight aliphatic alcohols, such as hexadecyl alcohol and octadecyl alcohol may also be employed and the alcohols may be either straight chain or branched. The only limitations are those described previously, particularly as to the nature of the reaction product obtained.

Similarly, useful polyhydroxy alcohols include ethylene glycol, glycerine, trimethylene glycol, tetramethylene glycol, pentamethylene glycol, etc., as well as the polyalkylene glycols such as diethylene glycol, triethylene glycol, etc. It should also be recognized that the alcohols may be substituted with other groups provided those groups do not interfere with the formation of the desired reaction product, e.g., boric acid-alcohol complex, boric acid-alcohol ester, etc., and do not exert a deleterious influence on the nylon structure into which it is to be incorporated. Examples of substituted alcohols are N-beta-hydroxyethylaniline, diethanolamine, triethanolamine, N,N-(bis-hydroxymethyl-alpha)-picoline, and the like.

The proportions of reactants are not critical in the production of the useful reaction products provided, however, there is sufficient alcohol to provide at least one hydroxyl group per molecule of boric acid. Thus, for monohydric alcohols, there should be a mole ratio of alcohol to boric acid of at least 1.0; for dihydric alcohols of at least 0.5; for trihydric alcohols of at least 0.33; etc. Substantial excesses of alcohol may be employed. Thus, useful trihydric alcohol-boric acid reaction products have been prepared from reaction mixtures in which the alcohol to acid mole ratio exceeded 3:1.

The most outstanding reaction product found useful in the present invention is that obtained by reacting glycerine with boric acid in a mole ratio of 1:1 with the elimination of at least 2:5 moles of water. The resulting product is a polyester having particularly superior properties as an additive for nylon structures.

Other polyhydric alcohols may be employed in place of glycerine. In this respect, the triols are particularly useful. However, any of the polyhydric alcohols such as 1,2,4-butanetriol; 1,2,6-hexanetriol; glycerine dimer and polymers such as the commercial mixtures designated as "polyglycerol"; hydroxypropyl glycerine; 2-hydroxymethyl glycerine; trimethylolpropane; erythritol; arabitol; sorbitol; xylitol; pentaerythritol; or inositol, may be reacted with boric acid with the elimination of at least 2.5 mols of water to provide ester or polyester reaction products which are useful in the present invention. The glycerine boric acid polyester, however, is preferred as an exceptional treating agent for use in the present invention.

The present invention is particularly useful with Nylon-6. It is not, however, restricted to this nylon. Thus, the invention finds use with Nylon-6, polycaprolactam; Nylon-66, polyhexamethylene adipamide; Nylon-7, polyenantholactam; Nylon-4, polybutyrolactam; and Nylon-5, polyvalerolactam, as well as with blends of various nylons, e.g., a blend of Nylon-6 and Nylon-61 (polyhexamethylene isophthalamide).

The nylon to be treated may be in the form of yarn, filament, fiber, or tire cord. It is suitably treated by passing the specified nylon structure through a bath of the treating agent. Thus the nylon structure is contacted with the treating agent while the treating agent is in liquid form. This may be suitably accomplished by dissolving the boric acid-alcohol reaction products in a suitable solvent which will assist in attaining penetration of the reaction product into the nylon structure. Where the reaction product is prepared from a reaction mixture having a molar excess of alcohol, the reaction product can be employed as the treating bath without further dilution. Suitable solvents for dissolving the reaction product, e.g., a polyester, to obtain a suitable bath include glycerine and N-beta-hydroxyethylaniline. Other polyhydroxy alcohols and aminohydroxy compounds which are capable of penetrating the nylon structure and which are capable of dissolving the reaction product find utilization in the present invention.

While the treating agent may be introduced into dipped tire cord, it is preferred to treat cord prior to the final heat stabilization treatment and cord dipping. Particularly advantageous results are obtained when the treating agent is introduced into the nylon structure subsequent to the primary crystallization and orientation of the structure.

A number of factors must be considered to obtain a suitable product in accordance with the present invention. It is necessary that the treatment be conducted at an elevated temperature. While this will vary depending on the particular treating agent being employed, the minimum treating temperature can be determined readily once the purpose and manner of treating is understood. In some instances, a temperature of the order of 160° to 180° C. is most desirable; however, in many instances the reaction product solvent will not permit the use of such temperatures and lower temperatures on the order of 100° to 160° C. will be necessary consistent with the properties of the solvent.

The duration of treatment is also quite important. While the effectiveness of the treatment depends on a time-temperature relationship, it has generally been found that reducing the treatment time to less than about nine seconds causes a drop-off in the effectiveness of the present invention. Particularly good results are obtained with treatments of at least fifteen seconds. Treatments in excess of thirty seconds (and in some instances, in excess of a minute) may be necessary to produce a corresponding improvement in properties. The optimum time for any particular treating agent will vary, depending on the nature of the treating agent, the particular nylon being treated and the temperature of treatment. No additional benefit will be obtained by prolonging the treatment beyond the optimum time for that particular set of materials and temperature.

When treating tire cord, yarn and such nylon structures, good practice dictates that the structure be maintained under tension during the heat treatment. In general, the yarn, cord or fibers are maintained under a tension of 700–1400 grams. As employed herein, tension is given as the force exerted on a cord of 2 x 840 denier yarn. Corresponding values for materials of other denier are readily calculated in the usual manner. While under some circumstances lower or higher tensions can be tolerated, under no circumstances should the tension drop below the minimum tension requirement for the treatment material which exists between 0 and 700 grams, e.g., 100 to 600 grams. The minimum tension is that which is just sufficient to prevent substantial loss of fiber orientation under the conditions of treatment. Although the upper limit can approach the breaking load, in general, it should be maintained below about 2,500 grams. A tension in the range of about 600 to about 800 grams is suitable.

The treatment is most satisfactorily effected by passing the nylon structure through a bath of the treating agent maintained at the desired treating temperature. The tension of the nylon structure in the bath can be maintained by standard tensioning means. The duration of the treatment can be controlled by the location of the rolls in the treating bath and the take-up speed of the nylon structure throughout the bath.

While the foregoing method is suitable, it is possible to pass the nylon structure through a bath of treating agent at room temperature, and to then pass the nylon structure for the desired treating time, e.g., two to three minutes, through a suitable oven maintained at the desired temperature, e.g., 160° C. When treating a formed nylon structure, penetration of the treating agent into the filament or fiber making up the yarns and/or tire cords is essential and this factor must be considered in selecting a suitable solvent for the reaction product.

It is also important that the treating agent, once it has penetrated the structure should be retained in the structure in an effective amount under the conditions of temperature to which the treated tire cord will be subjected in subsequent tire manufacturing operations. It appears likely that the effective amount of the treating agents enters into the amorphous portions of the drawn nylon filament without appreciably affecting the crystalline portions which give the nylon its desirable tensile properties. It is this which is one of the prime advantages of utilizing the boric acid polyesters in the present invention. The borate esters are retained very effectively in the nylon structure throughout a number of processing operations. Thus, it is of little importance whether the solvent be retained in the nylon structure provided the solvent can provide the necessary penetrability for the reaction product. It has been found, however, that a number of these solvents are also useful for lowering the response lag of the nylon structures. Of these, glycerine and anilinoethanol are particularly notable. Thus, retention of solvents such as those just mentioned, will further enhance the properties of the treated product. A very substantial portion of these solvents will be lost, however, during the subsequent treating operations.

As will be noted in the examples, the preferred and superior treating process for treating formed nylon structures in accordance with the present invention comprises passing the nylon structure under a tension of 700 to 1400 grams through a bath of the treating agent maintained at a temperature in the range of 100 to 175° C. for a treating time of from about fifteen to about sixty seconds. By this method, nylon tire cord can be obtained which is characterized by the presence of substantial quantities of the treating agent in the nylon structure and by an initial modulus which is substantially less than the modulus of the untreated nylon structure.

It has been found to be advantageous to follow the treating process with a quick wash or other treatment to remove treating agent from the surface of the nylon structure, followed by a supplemental heat treatment of the order of three minutes in duration in an air oven at a temperature of about 160 to 180° C. In the examples which follow, all supplemental heating was in an air oven unless otherwise stated. Unexpectedly, the washed and heated yarn, cord, or fibers have been found to have enhanced crystallinity, as indicated by X-ray data, over that observed in like products wherein the same steps were followed except that the treatment with treating agent was omitted.

In addition to treating the shaped nylon structure, it is also possible to treat the nylon prior to the shaping operation. Thus nylon chips prior to extrusion can be treated with a suitable treating solution incorporating the boric acid reaction products which will be retained in nylon structures formed from the nylon chips. As a general proposition, it has been found advantageous to use a volatile solvent for the reaction products when treating nylon chips or pellets prior to forming the final nylon structure. A typical example of such a solvent is methanol. Such solvents normally have extremely good penetrability of the nylon but very low retention in the nylon. Since the reaction product is the primary effective treating agent, the loss of the solvent is of little importance.

Still another effective way of introducing the reaction products into the nylon is at the melting stage. Suitably, nylon is melted and maintained at an elevated temperature until a clear melt is obtained. Substantial quantities of boric acid reaction products may be introduced into this melt to form a homogeneous solution which can be cooled and solidified without separation of the reaction products. The resulting product may then be treated in the same manner that the nylon would ordinarily be treated to form chips or nylon structures which are useful as tire cord.

As was noted previously, there has been found to be a correlation between rate of recovery from flat-spotting of tires containing a particular tire cord and the response lag characteristics of the nylon fiber or yarn which makes up the tire cord. Response lag is determined by suspending a weight of three pounds from a filament, yarn, or cord of 50 centimeters in length for a period of four hours. The total denier of the material so tested is from 1660 to 2000. At the conclusion of that period, the total length of the stretched nylon is determined. A portion of the weight, e.g., two pounds, is then removed and the nylon is permitted to relax under the reduced weight for a period of sixteen hours. The weight is again increased to the original value and the length of the nylon material is measured after twelve seconds. The difference between the last measurement and the measurement at the conclusion of the first suspension period, measured in mils, is referred to as the response lag. It is important, of course, that the entire test be conducted at constant temperature and humidity. The usual conditions for the test are a temperature of 25° C. and a relative humidity of 85%.

The determination of initial modulus referred to above is made on an Instron tester with flat, rubber-faced jaws ten inches apart with a cross-head speed of ten inches per minute and a chart speed of fifty inches per minute. The filament is clamped in the jaws, and the machine started on the five-pound scale. A tangent is drawn to the inked line on the chart at the two percent elongation location, and extended the full width of the chart. The initial modulus is calculated by the formula:

$$\text{Inital Modulus (g.-den.}^{-1}) = \frac{227{,}000}{\text{denier} \times \text{difference in elongation as determined by the intercepts of the tangent from 0 to 5-pound load}}$$

If the treatment given a cord reduces both the response lag and the initial modulus sufficiently, a low flat-spotting effect can be expected when the cord is used in tires.

Details of the method for producing boric acid-aliphatic alcohol reaction products will be found in the Journal of Physical Chemistry, vol. 47 (1943), pp. 204 through 234. While the discussion therein is directed principally to borates of polyhydric alcohols, the methods are applicable to the reaction products with monohydric alcohols as well.

In the examples, the response lag and initial modulus were determined as discussed above.

Examples A-1 through A-47

In accordance with the present invention, Nylon-6 greige tire cord of 1680 denier having a response lag of the order of 240 mils, was treated with a series of glycerine/boric acid reaction products produced by the reaction of glycerine and boric acid with the elimination of about three mols of water. The reaction product was applied as a solution in glycerine or in anilinoethanol or as the reaction product of a molar excess of glycerine with boric acid. In all of the tests, treatment time was one minute. The treating conditions and the physical properties of the treated products are set forth in Table A. In the tables, the heading "Gl./B.A. Molar Ratio" refers to the ratio of glycerine to boric acid in the reaction product. Following treatment with the specified treating agent, the nylon cord was washed with water, alcohol, or a mixture of the two. The alcohol used in these instances was ethanol; however, other lower alkanols can also be used for the washing step.

As may be seen from Table A, the preferred and superior treating agent for the purposes of the present invention comprises a 25 to 50% by weight solution in glycerine or anilinoethanol of the glycerine/boric acid polyester prepared by the reaction of 1 mol of glycerine and 1 mol of boric acid with the elimination of about 94% of the theoretical three mols of water. With such a solution of 25 to 50%, an initial material pickup of the order of 20% to 25% is attained with about 10% (about 2.5 or 5.0 percent) retained after the supplemental heat treatment. The response lag can be retained substantially below 120 mils, well below half that of the untreated material, even after such severe heat treatments as a combination of 15 minutes at 160° C. followed by 60 hours at 90° C. in an air oven.

respectively, two, four and six parts by weight of polyester per 100 parts of nylon chips. The nylon was then passed through a standard screw extruder at 52° F. at the maximum screw speed and the resulting extrusions were chopped to provide feed for a melt spinning unit.

TABLE A

| Run No. | Polyester Treating Agent Gl/B.A. molar ratio | Solvent | Polyester concentration, percent | Temp. of 1 min. treatment (° C.) | Wash | Suppl. Heat. Time (min.) | Suppl. Heat. Temp. (° C.) | Percent material pickup | Response lag | Break load (lbs.) | Init. mod., g./den. | Percent elongation |
|---|---|---|---|---|---|---|---|---|---|---|---|---|
| A-1 | 1/1 | Glycerin | 48 | 160 | Water | 3 | 160 | 10.3 | 116 | 23.5 | 15.5 | 20.9 |
| A-2 | 1/1 | do | 48 | 160 | do | 15 | 160 | 8.93 | 104 | 22.7 | 15.1 | 20.0 |
| A-3 | 1/1 | do | 48 | 120 | do | 3 | 160 | 18.3 | 118 | 29.4 | 11.9 | 29.1 |
| A-4 | 1/1 | do | 48 | 120 | do | 15 | 160 | 14.1 | 105 | 30.0 | 14.35 | 27.0 |
| A-5 | 1/1 | do | 48 | 160 | Alcohol | 15 | 160 | 13.2 | 104 | 25.0 | 14.4 | 21.7 |
| A-6 | 1/1 | do | 48 | 160 | do | 15 (Plus 63 hr. at 92° C.) | 160 | 3.1 | 119 | 23.4 | 22.1 | 19.8 |
| A-7 | 1/1 | do | 48 | 120 | do | 15 (Plus 63 hr. at 92° C.) | 160 | 7.9 | 116 | 30.5 | 16.65 | 29.7 |
| A-8 | 2/1 | do | 50 | 120 | do | 3 | 160 | 21.1 | 143 | 30.1 | 11.7 | 30.9 |
| A-9 | 2/1 | do | 50 | 120 | do | 15 | 160 | 11.5 | 114 | 30.2 | 12.15 | 32.2 |
| A-10 | 2/1 | do | 50 | 120 | do | 15 (Plus 41 hr. at 90° C.) | 160 | 4.7 | 109 | 30.4 | 13.35 | 31.3 |
| A-11 | 1/1 | Anilinoethanol | 42.5 | 115 | do | 3 | 160 | 19.4 | 116 | 29.9 | 10.2 | 30.5 |
| A-12 | 2/1 | Unreacted glycerine | | 160 | do | 3 | 160 | 20.9 | 115 | 27.6 | 12.6 | 27.5 |
| A-13 | 2/1 | do | | 160 | do | 15 | 160 | 14.0 | 117 | 27.4 | 12.6 | 27.6 |
| A-14 | 2/1 | do | | 160 | do | 15 | 160 | 8.0 | 123 | 29.1 | 14.2 | 26.8 |
| A-15 | 2/1 | Glycerine | 50 | 160 | do | 3 | 160 | 16.7 | 119 | 24.4 | 12.3 | 23.6 |
| A-16 | 2/1 | do | 50 | 160 | do | 15 | 160 | 9.4 | 117 | 27.7 | 12.3 | 28.2 |
| A-17 | 2/1 | do | 50 | 160 | do | 15 (Plus 63 hr. at 90° C.) | 160 | 3.3 | 136 | 28.8 | 14.35 | 28.3 |
| A-18 | 3/1 | Unreacted glycerine | | 120 | do | 3 | 160 | 25.4 | 138 | 28.7 | 12.0 | 29.6 |
| A-19 | 3/1 | do | | 120 | do | 3 | 160 | 25.4 | 138 | 28.7 | 12.0 | 29.6 |
| A-20 | 3/1 | do | | 120 | do | 15 | 160 | 15.8 | 114 | 30.1 | 12.0 | 32.9 |
| A-21 | 3/1 | do | | 120 | do | 15 (Plus 41 hrs. at 90° C.) | 160 | 14.4 | 114 | 30.0 | 12.0 | 30.3 |
| A-22 | 3/1 | do | | 160 | do | 3 | 160 | 26.2 | 117 | 21.6 | 11.4 | 21.9 |
| A-23 | 3/1 | do | | 160 | do | 15 | 160 | 14.2 | 115 | 28.0 | 12.5 | 27.5 |
| A-24 | 3/1 | do | | 160 | do | 15 (Plus 41 hrs. at 90° C.) | 160 | 6.2 | 128 | 28.1 | 13.55 | 28.4 |
| A-25 | 1/1 | Anilinoethanol | 42.5 | 117 | do | 15 | 160 | 15.1 | 114 | | | |
| A-26 | 1/1 | do | 42.5 | 117 | do | 15 (Plus 63 hrs. at 92° C.) | 160 | 9.9 | 119 | | | |
| A-27 | 1/1 | Glycerine | 50 | 120 | do | 3 | 160 | 29.5 | 144 | | | |
| A-28 | 1/1 | do | 50 | 120 | do | 15 | 160 | 29.5 | 116 | | | |
| A-29 | 1/1 | do | 50 | 120 | do | 15 (Plus 63 hrs. at 90° C.) | 160 | 19.9 | 112 | | | |
| A-30 | 1/1 | do | 50 | 120 | Water | 15 (Plus 63 hrs. at 90° C.) | 160 | 10.3 | 131 | | | |
| A-31 | 1/1 | Anilinoethanol | 42.5 | 130 | Alcohol | 3 | 160 | 22.1 | 99 | 27.8 | 10.15 | 29.8 |
| A-32 | 1/1 | do | 42.5 | 117 | do | 3 | 160 | 20.1 | 107 | 28.4 | 9.25 | 32.1 |
| A-33 | 1/1 | do | 42.5 | 130 | do | 3 | 160 | 20.0 | 113 | 27.9 | 9.35 | 32.0 |
| A-34 | 1/1 | do | 25 | 117 | do | 3 | 160 | 16.4 | 105 | 28.8 | 9.7 | 31.0 |
| A-35 | 1/1 | do | 25 | 120 | do | 15 (Plus 41 hrs. at 90° C.) | 160 | None | 159 | 30.1 | 17.8 | 28.7 |
| A-36 | 1/1 | do | 25 | 130 | do | 3 | 160 | 15.3 | 100 | 25.6 | 9.55 | 26.7 |
| A-37 | 1/1 | do | 25 | 117 | do | 3 | 160 | 13.7 | 102 | 28.7 | 8.4 | 33.9 |
| A-38 | 1/1 | Glycerine | 50 | 140 | Water | 3 | 160 | 19.5 | 117 | 27.2 | 11.1 | 26.0 |
| A-39 | 1/1 | do | 50 | 160 | do | 3 | 160 | 21.9 | 108 | 27.0 | 11.1 | 27.6 |
| A-40 | 1/1 | do | 50 | 100 | Alcohol | 3 | 160 | 27.5 | 130 | 28.6 | 11.2 | 29.3 |
| A-41 | 1/1 | do | 50 | 120 | do | 3 | 160 | 13.8 | 122 | 29.2 | 10.45 | 32.2 |
| A-42 | 1/1 | 15% anilinoethanol, 37% glycerine. | 48 | 120 | do | 3 | 160 | 24.8 | 117 | 29.6 | 9.7 | 33.8 |
| A-43 | 1/1 | do | 48 | 130 | do | 3 | 160 | 16.2 | 116 | 28.3 | 10.3 | 28.9 |
| A-44 | 1/1 | do | 48 | 140 | do | 3 | 160 | 20.3 | 120 | 29.4 | 10.3 | 30.9 |
| A-45 | 1/1 | do | 48 | 160 | 50% Alcohol, 50% Water | 3 | 160 | 23.9 | 110 | 25.5 | 10.8 | 25.9 |
| A-46 | 1/1 | do | 48 | 120 | do | 3 | 160 | 23.4 | 124 | 28.0 | 9.55 | 30.6 |
| A-47 | 1/1 | do | 48 | 130 | do | 3 | 160 | 25.2 | 125 | 28.5 | 9.8 | 30.0 |

Examples B-1 through B-3

A 50% solution of glycerine-borate polyester (1/1 molar ratio with the elimination of three mols of water) was made by dissolving the polyester in an equal weight of methanol. The methanol solution was poured over Nylon-6 chips and the mixture was tumbled. Methanol was then evaporated and the product was dried in an oven at 175° C. for 16 hours. Three different samples were prepared in this manner to provide a product having Yarns were drawn from the treated materials with draw ratios of 5.1. Tire cords of 1680 denier made from the yarn had the physical properties set forth in Table B.

TABLE B

| Run No. | Parts of polyester per hundred parts of Nylon-6 | Tenacity, in grams per denier | Elongation in percent | Response lag |
|---|---|---|---|---|
| B-1 | 2 pt. glycerol borate | 7.28 | 19.3 | 134 |
| B-2 | 4 pt. glycerol borate | 5.97 | 22.3 | 103 |
| B-3 | 6 pt. glycerol borate | 5.83 | 20.8 | 84 |

Examples C-1 and C-2

Nylon-6 was charged to a heating vessel and heated over a period of 35 minutes up to a temperature of about 260° C. at which temperature the nylon was a clear melt. To this melt was added a glycerine/boric acid polyester (prepared by the reaction of 1 mol of glycerine with 1 mol of boric acid with the elimination of 3 mols of water) to provide a melt containing 5% of the polyester. The melt was maintained at elevated temperature until the polyester charge was completely dispersed in the melt. The solidified mass retained the polyester and appeared to be a homogeneous blend.

In a second test, the melt blending was repeated except that the polyester content of the melt was increased to 10%. The solidified product again appeared to be a well-blended homogeneous mass. Following the usual procedures, the polymer mass was converted into yarn and the yarn converted into nylon tire cord of 1680 denier. The physical properties of the tire cord were determined and are set forth in Table C.

TABLE C

| Run No. | Percent of polyester in yarn | Tenacity, in grams per denier | Elongation in percent | Response lag |
|---|---|---|---|---|
| C-1 | 5 | 4.73 | 24.1 | 89 |
| C-2 | 10 | 3.11 | 19.5 | 62 |

Examples D-1 through D-19

The procedure of Examples A-1 through A-47 was repeated, except that the treating agent comprised complexes of boric acid with alcohols made by simply dissolving boric acid in the glycerine or other alcohol without drawing off any water. The treated nylon cord was water washed in each instance, but in some instances, an acetone wash was also used. The treating conditions and the physical properties of the treated products are set forth in Table D.

TABLE D

| Run No. | Treating agent | Temp. of 1 min. treatment (° C.) | Wash | Suppl. Heat Time (min.) | Suppl. Heat Temp. (° C.) | Percent material pickup | Response lag | Break load (lbs.) | Init. mod., g./den. | Percent elongation |
|---|---|---|---|---|---|---|---|---|---|---|
| D-1 | 25% boric acid, 75% glycerine complex. | 120 | Water | 15 | 160 | 14.0 | 103 | 28 | 10.8 | 26.9 |
| D-2 | do | 120 | do | 3 | 160 | 21.6 | 109 | 27.9 | 9.9 | 28.7 |
| D-3 | do | 160 | do | 3 | 160 | 25.9 | 109 | 20.9 | 13.6 | 20.5 |
| D-4 | do | 160 | do | 15 | 160 | 19.0 | 105 | 19.0 | 13.6 | 18.7 |
| D-5 | do | 100 | do | 3 | 160 | 13.9 | 134 | | | |
| D-6 | do | 100 | do | 15 | 160 | 9.1 | 120 | | | |
| D-7 | 50% boric acid, 50% glycerine complex. | 120 | do | 3 | 160 | 22.7 | 115 | | | |
| D-8 | do | 120 | do | 15 | 160 | 17.8 | 113 | | | |
| D-9 | 25% boric acid, 75% glycerine complex (half of boric acid reacted with NaOH). | 120 | do | 15 | 160 | 13.9 | 149 | | | |
| D-10 | do | 120 | do | 15 (Plus 61 hrs. at 190° F.) | 160 | 14.6 | 138 | | | |
| D-11 | do | 120 | do | 3 | 160 | 16.3 | 151 | | | |
| D-12 | 25% boric acid, 75% anilinoethanol. | 115 | (1) Acetone; (2) water | 3 | 160 | 23.9 | 97 | 24.4 | 7.8 | 25.3 |
| D-13 | do | 115 | (1) Water; (2) acetone | 15 | 160 | 10.1 | 128 | 27.1 | 14.5 | 24.8 |
| D-14 | do | 115 | do | 15 (Plus 84 hrs. at 190° F.) | 160 | 10.8 | 115 | 28.5 | 17.5 | 25.5 |
| D-15 | 31.2% boric acid, 68.8% glycerine. | 130 | do | 15 | 160 | 18.8 | 118 | 24.1 | 13.1 | 21.9 |
| D-16 | do | 115 | do | 15 | 160 | 17.9 | 116 | | | |
| D-17 | do | 115 | do | 15 (Plus 61 hrs. at 190° F.) | 160 | 8.8 | 139 | 28.7 | 20.5 | 24.0 |
| D-18 | do | 115 | do | 3 | 160 | 24.1 | 103 | 28.9 | 11.6 | 28.8 |
| D-19 | do | 130 | do | 3 | 160 | 19.9 | 113 | 27.8 | 11.8 | 27.3 |

Examples E-1 through E-10

The procedure of Examples A-1 through A-47 was repeated, except that the treating agent comprised boric acid esters with anilinoethanol (the trivial name, used hereinafter for brevity to designate N-beta-hydroxyethylaniline). The treated nylon cord was alcohol washed in each instance. The treating conditions and the physical properties of the treated products are set forth in Table E.

TABLE E

| Run No. | Treating agent | Temp. of 1 min. treatment (° C.) | Suppl. Heat Time (min.) | Suppl. Heat Temp. (° C.) | Percent material pickup | Response lag | Break load (lbs.) | Init. mod. g./den. | Percent elongation |
|---|---|---|---|---|---|---|---|---|---|
| E-1 | 1 mole anilinoethanol, boric acid ester (1/1 mole ratio) dissolved in 1 mole anililnoethanol. | 115 | 15 | 160 | 24.7 | 127 | 31.3 | 18.2 | 28.7 |
| E-2 | Anilinoethanol/boric acid ester (3/1 molar ratio). | 115 | 3 | 160 | 18.8 | 144 | | | |
| E-3 | do | 115 | 15 | 160 | 17.7 | 150 | | | |
| E-4 | 1 mole anilinoethanol, boric acid ester (3/1 molar ratio) dissolved in 1 mole anilinoethanol. | 115 | 3 | 160 | 14.9 | 141 | | | |
| E-5 | do | 115 | 15 | 160 | 9.5 | 159 | | | |
| E-6 | 1 mole anilinoethanol, boric acid ester (3/1 molar ratio) dissolved in 3 moles anilinoethanol. | 115 | 3 | 160 | 13.1 | 133 | | | |
| E-7 | do | 115 | 15 | 160 | 8.0 | 150 | | | |
| E-8 | Anilinoethanol/boric acid ester (3/1 molar ratio). | 115 | 15 (Plus 41 hrs. at 190° F.) | 160 | 9.6 | 168 | | | |
| E-9 | 1 mole anilinoethanol/boric acid ester (3/1 molar ratio) dissolved in 1 mole anilinoethanol. | 115 | 15 (Plus 31 hrs. at 190° F.) | 160 | 6.8 | 185 | | | |
| E-10 | 1 mole anilinoethanol/boric acid ester (3/1 molar ratio) dissolved in 3 moles anilinoethanol. | 120 | 15 (Plus 41 hrs. at 190° F.) | 160 | 3.1 | 185 | | | |

While the response lag test is a good indication of the flat-spotting characteristics to be expected from any particular nylon yarn, filament, or tire cord, tires were prepared using tire cord of the present invention and the tires were tested for flat-spotting. The tire tests bore out the showings of the response lag tests that the producs of the present invention did minimize flat-spotting problems.

In the test employed on the tires, a tire mounted on an automobile is placed in contact with a rotating drum.

The drum, in turn, causes the tire to rotate. In this manner, the tire is caused to rotate for 15 minutes at a rate corresponding to 80 miles per hour. The car is then removed from contact on the drum and allowed to sit for seventeen hours. The car is then raised and the tire placed in contact with the rotating drum which causes the tire to rotate at a rate corresponding to thirty miles per hour. The presence of a flat spot on the tire will cause the wheel axle to undergo an acceleration, when the flat spot contacts and ceases contact with the drum, along a line passing through the axle and through the point of contact between the drum and the tire. This acceleraion of the axle is measured after one-half minute and after five minutes of rotation at a rate corresponding to thirty miles per hour. This is the test that was employed in Example F.

Example F

Nylon-6 tire cord was prepared from a blend of Nylon-6 containing 5% (by weight) of glycerine boric acid polyester prepared from 1:1 mole ratio of glycerine and boric acid with elimination of about 3 moles of water in accordance wtih the present invention. The yarn was 928 to 936 denier with an elongation at break of 17.8 to 18.1%, a break load of 13.2 to 14.0 pounds, and a response lag of 86 to 100 mils. Greige cord produced therefrom had a denier of 2020 to 2037, a 10-pound elongation of 9.0 to 9.1%, an elongation at break of 22.7 to 24.2, and a break load of 25.4 to 26.6 pounds. Tires were made using the greige cord and were then subjected to the previously described tire test. The axle acceleration after ½ minute was 3.7 g. and after 5 minutes was 1.5 g.

The invention is illustrated on the accompanying drawing, wherein:

FIGURE 1 is a sectional view of a pneumatic tire in accordance wtih this invention; and FIGURE 2 is a fragmentary perspective view of a tire cord in accordance with this invention.

In the drawing, there is shown a four-ply pneumatic tire 10 having embedded therein reinforcing cords 12 in accordance with this invention. An isolated cord 12 of the composition disclosed herein is shown in FIGURE 2 as comprising a plurality of individual filaments 14 piled and twisted together to form the cord 12.

What is claimed is:

1. Rubber tires having as the primary reinforcement polycarbonamide tire cord, characterized by 2.5 to 5.0 percent of a reaction product of boric acid and glycerine, based on the weight of the cord, distributed through the polycarbonamide structure, the reaction product being prepared by the reaction of one mol of glycerine and one mol of boric acid with the elimination of about 94 percent of the theoretical three mols of water.

References Cited

UNITED STATES PATENTS

| 2,557,808 | 6/1951 | Walker | 260—78 |
| 3,143,528 | 8/1964 | Finestone et al. | 260—78 |
| 2,770,282 | 11/1956 | Herzegh | 152—330 |
| 2,922,727 | 1/1960 | Levison | 117—138.8 |
| 3,220,456 | 11/1965 | Ahles | 152—330 |
| 3,258,049 | 6/1966 | Ahles et al. | 152—330 |

FOREIGN PATENTS 541,072   11/1941   Great Britain.

HAROLD D. ANDERSON, Primary Examiner

U.S. Cl. X.R.

8—147; 57—140; 117—138, 161; 260—78, 857; 264—210

UNITED STATES PATENT OFFICE
CERTIFICATE OF CORRECTION

Patent No. 3,459,251      Dated August 5, 1969

Inventor(s) Richard W. Kibler

It is certified that error appears in the above-identified patent and that said Letters Patent are hereby corrected as shown below:

Col. 2, line 57

"means" should read -- meant --

Col. 3, line 33

"2:5" should be -- 2.5 --

Columns 7 and 8 - Table A

In line A-10 under Response Lag "109" should be -- 119 --

Table D, lines D-16, D-17 and D-18, D-19

"68.8% glycerine" should be -- 68.8% anilinoethanol --

Table E, Lines E-9

Under "Time" "31 hrs." should read -- 41 hrs. --

Column 10 of the patent, line 72

"producs" should be -- products --

Signed and sealed this 31st day of August 1971.

(SEAL)
Attest:

EDWARD M. FLETCHER, JR.
Attesting Officer

ROBERT GOTTSCHALK
Acting Commissioner of Patents